United States Patent Office 2,765,308
Patented Oct. 2, 1956

2,765,308

MACROCYCLIC COLORING COMPOUNDS AND PROCESS OF MAKING THE SAME

John B. Campbell, Bellevue, Del., assignor to E. I. du Pont de Nemours and Company, Wilmington, Del., a corporation of Delaware No Drawing. Application August 15, 1952,
Serial No. 304,639

21 Claims. (Cl. 260—270)

This invention relates to novel macrocyclic organic coloring matters which are related in structure to the porphyrazines.

It is an object of this invention to prepare novel organic compounds, useful as pigments and yielding shades outside the range normally found in the phthalocyanine coloring matters. Various additional objects and achievements of this invention will appear as the description proceeds.

Porphyrazine compounds have been defined by Linstead et al. (J. C. S., 1937, p. 911), as compounds having the central ring system of the phthalocyanine molecule; that is, they are compounds which include in their molecule a macrocyclic ring of the following configuration,

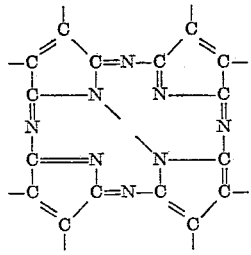

The double and single bonds may be laid out in a different tautomeric arrangement than the one shown above, and the free valencies shown in two of the inner N-atoms may be satisfied by attachment to hydrogen atoms or to metallic atoms or radicals. But it seems to be part of the definition that the porphyrazine compound contains a macrocyclic ring of 8 C atoms and 8 N-atoms running in alternation, and 4 pyrrole rings.

My present invention concerns compounds which contain the same macrocyclic ring but only two pyrrole rings, which are apparently disposed diagonally across from each other. Accordingly, I shall designate them generically as hemiporphyrazines.

The other two, diagonally disposed, C–N–C groupings in the macrocyclic ring are still parts of smaller, unsaturated (i. e. aromatic) rings, but these are not pyrrolic rings.

The two nitrogen atoms which have free bonds for attachment to hydrogen atoms or metals may be the nitrogens of the two pyrrole rings or the nitrogens of the non-pyrrolic rings. Indeed, it is conceivable that the same reaction product contains both types in admixture.

I find that compounds of this structure are highly colored, water-insoluble substances (hence, pigments) of excellent light fastness and good thermal stability, but their range of colors are totally outside the range of the porphyrazine compounds. The most common representatives of the latter are the phthalocyanines, whose colors, as is well known, range from reddish-blue to green. The products of this invention on the other hand have colors in the range of yellow to orange to brown when in dihydrogen form, and in the regions of orange, brown and olive when they are in the form of their metal chelates.

My invention thus extends considerably the spectrum of available organic pigments which are fast to light and to heat.

I prepare my novel compounds by reacting molecular equivalents of an aromatic ortho-dinitrile with a non-pyrrolic nitrogenous aromatic (that is, unsaturated) heterocyclic compound which bears two primary amino groups in positions ortho to a cyclic N-atom. As typical examples of the latter may be mentioned at this point 2,6-diamino-pyridine and 3,5-diamino-1,2,4-triazole.

In a more general sense, the non-pyrrolic aromatic heterocyclic compound employed in my invention may be any compound which can by tautomeric rearrangement, theoretically or actually be converted into a compound having two primary amino groups in positions ortho to a cyclic N-atom; it may therefore be any compound having one of the following structures,

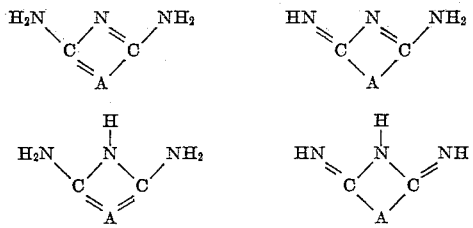

wherein A represents a group of 2 or 3 atoms (carbon or otherwise) needed to complete an aromatic (i. e. unsaturated) heterocyclic ring with the two C-atoms shown in each formula.

The reaction is effected simply by heating the two compounds together in a suitable solvent, for instance ethylene glycol or any other high-boiling alcoholic solvent at temperatures of 165° to 200° C., or higher if need be.

Since 2 molecules of the dinitrile and 2 molecules of the non-pyrrolic diamino-heterocyclic compound are required to form the macrocyclic ring, it is clear that the use of equimolecular proportions of the two will lead to products of highest purity. Deviations from this idea, however, say up to 10% either way, are tolerable.

As reaction proceeds, ammonia is liberated, and a colored precipitate is formed. Taking the reaction of phthalonitrile with 2,6-diamino pyridine as a typical example, the reaction may be expressed by the following equation:

$$2C_6H_4(CN)_2 + 2C_5H_3N(NH_2)_2 \rightarrow C_{26}H_{14}N_8.H_2 + 2NH_3$$

The formula for the reaction product is written with two hydrogens separated from the remainder, to indicate that the reaction product as obtained directly in the synthesis is the dihydrogen form of the pigment; that is, the two free N-valences within the macrocyclic ring are satisfied by hydrogen.

These two hydrogen atoms are of an ionic or labile nature. They are readily replaceable in organic solvent solution by cations of strong bases for instance tetramethyl ammonium hydroxide, benzyl-trimethyl ammonium hydroxide, choline, or similar strongly basic compounds which are soluble in organic solvents. On the other hand, they may also be replaced by metallic atoms or radicals, for instance copper, cobalt, iron, magnesium, zinc, and lead, by similar treatment in organic solvents such as pyridine, quinoline or dimethylaniline, preferably in the presence of a strong, solvent-soluble basic compound such as choline. The metallic atoms thus introduced are not ionizable, and are therefore to be regarded as chelates (i. e. attached by coordinate valencies; see Encyclopedia of Chemical Technology, vol. 4, p. 379 ff.). The organic base compounds on the other hand may be regarded simply as salts.

Without limiting my invention, the following examples are given to illustrate my preferred mode of operation. Parts mentioned are by weight.

PART I.—SYNTHESIS

Example 1

To 226 parts of ethylene glycol in an agitated vessel fitted with a reflux condenser were added 9.9 parts of 3,5-diamino-1,2,4-triazole and 12.8 parts of o-phthalonitrile. The mixture was stirred and heated and a clear solution resulted. The temperature was then gradually raised to the reflux temperature (197°–198° C.), at which stage evolution of ammonia became quite pronounced for the first 40 minutes. Refluxing was continued for a total of 2.5 hours. The reddish brown precipitate which formed was filtered off from the hot solution, washed with hot ethylene glycol and finally with ethyl alcohol. The filter cake was then slurried with boiling ethyl alcohol, filtered, again slurried with boiling chloroform, filtered and dried. A reddish brown compound was obtained whose analysis corresponded to the formula $C_{20}H_{12}N_{12}$.

The compound did not melt at 400° C.; it was essentially insoluble in all common organic solvents, but dissolved slightly in boiling pyridine containing some added chloine. The structure of the compound is thought to be

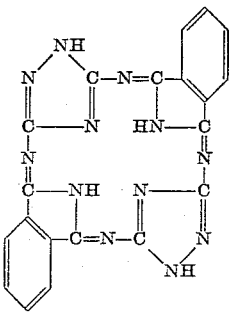

or

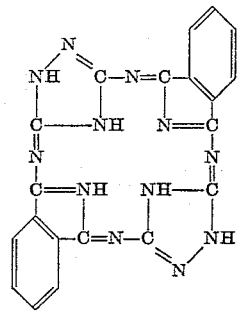

or possibly a mixture of the two.

Example 2

Example 1 was repeated using 17.3 parts of 4-nitrophthalonitrile instead of the phthalonitrile. A crystalline reddish brown powder was obtained which was quite stable to exposure in a Fade-Ometer.

Example 3

17.5 parts of 1-phenyl-3,5-diamino-1,2,4-triazole and 12.8 parts of o-phthalonitrile were put in 226 parts of ethylene glycol and refluxed for 2.5 hours. A brown precipitate formed which was filtered off hot, washed with hot ethylene glycol and then purified by slurrying and filtering in boiling ethyl alcohol and chloroform successively. On drying, a brown crystalline powder was obtained which analyzed as $C_{32}H_{20}N_{12}$. It was recrystallized unchanged by dissolving in dimethyl formamide containing a little tetramethyl ammonium hydroxide and then adding glacial acetic acid to precipitate the compound. On heating at 390° C. at 1 mm. pressure, it sublimed.

Example 4

In the same manner as in Example 3, equimolecular proportions of 1-(p-nitrophenyl)-3,5-diamino-1,2,4,-triazole and 4-nitrophthalonitrile were condensed to yield a brownish black powder. Its analysis agreed with the constitution $C_{32}H_{16}N_{16}O_8$.

Example 5

6.4 parts of o-phthalonitrile and 11 parts of 1-(p-nitrophenyl)-3,5-diamino-1,2,4-triazole were suspended in 445 parts of ethylene glycol and heated at reflux temperature for 3 hours. Ammonia was evolved. The mass was then cooled to 150° C. and filtered. The filter cake was washed twice with hot ethylene glycol, slurried twice with glacial acetic acid and finally washed with ethyl alcohol and dried. A brick-red powder resulted which on shot milling in acetone gave a red-brown powder. Its analysis agreed with the formula $C_{32}H_{18}N_{14}O_4$.

Example 6

12.8 parts of o-phthalonitrile and 10.9 parts of 2,6-diamino-pyridine were put in 226 parts of ethylene glycol and refluxed at 197–198° C. for one hour. Ammonia was evolved freely during the first 15–20 minutes. A greenish yellow precipitate was formed. The mass was cooled to about 100° C. and filtered. The precipitate was washed with hot ethylene glycol and then slurried with boiling chloroform and filtered. The yellow-green precipitate was then dissolved in 980 parts of boiling pyridine; the solution was filtered to remove a trace of insoluble matter, then evaporated until crystallization commenced, and allowed to cool. Reddish brown needle crystals formed which were filtered off and washed with pyridine. If the pyridine solution is allowed to cool without concentration, a product separates in the form of minute greenish yellow crystals. On heating to 150–180° C., these change to reddish brown crystals, which appear to be identical with those formed from the concentrated solution. The crystals decompose at 380–385° C. with some sublimation of undecomposed product. Analysis showed the product to have the constitution $C_{26}H_{16}N_8$. The compound is believed to have the structure

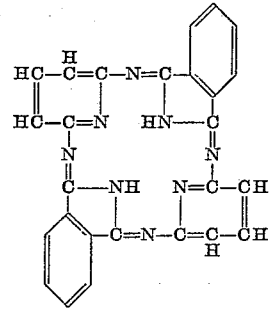

or a tautomeric rearrangement thereof.

Example 7

A mixture of 100 parts of 1,2-dicyanonaphthalene, 97 parts of 1-phenyl-3,5-diamino-1,2,4-triazole and 2500 parts of ethylene glycol was stirred and heated. A clear solution resulted and ammonia was evolved as the reflux temperature of 197°–198° C. was reached. The solution darkened and a precipitate soon formed. After a total of two hours' refluxing, the hot mixture was filtered, and the press cake was washed with hot ethylene glycol and then with hot chloroform to remove by-products. The product was dried to yield a heat-stable, brown pigment.

Example 8

28.2 parts of 5,6-diphenyl pyrazine-2,3-dinitrile and 17.5 parts of 1-phenyl-3,5-diamino-1,2,4-triazole were heated in 565 parts of ethylene glycol at the reflux temperature for 30 minutes. The reaction mass was cooled slightly, filtered and washed with hot ethylene glycol and then with ethyl alcohol. Upon drying, the product was obtained in the form of minute brown crystals. It was relatively soluble in pyridine, and its analysis agreed with the formula $C_{52}H_{32}N_{16}$.

PART II.—METALLIZATION

Example 9

2 parts of the macrocyclic product of Example 3 were pulverized and suspended in 166 parts of pyridine at 50°–60° C. Then 4 to 5 parts of a 50% solution of choline in methanol were added dropwise with stirring. After 15 minutes' agitation, the solution was filtered to remove a small amount of undissolved material and then a hot solution of 1.5 parts of cupric acetate monohydrate in 98 parts of pyridine was added while stirring. A black precipitate formed which, after 15 minutes of stirring, was filtered off and washed with hot pyridine. The filter cake was further purified by slurrying with boiling pyridine, filtering, re-slurrying with boiling glacial acetic acid, filtering and drying. There were obtained 1.53 parts of a black powder whose analysis agreed with the theoretical constitution $C_{32}H_{18}N_{12}Cu$.

Example 10

To a boiling solution of 1.45 parts of the product of Example 6 in 294 parts of pyridine was added a hot solution of 1 part of cupric chloride dihydrate in 98 parts of pyridine. 198 parts of the pyridine were then distilled off and the residue was stirred at a reflux for 2 hours. The mass was then cooled and filtered, washed with pyridine, then with methanol, and dried under vacuum at 140° C. The product was obtained in the form of small green needles which did not melt at 400° C. Its analysis indicated the constitution $C_{26}H_{14}N_8Cu$.

Example 11

By following the same general procedure as in Example 10, and using each metal in the form of its chloride, the following additional metal chelates of the product of Example 6 were formed, with colors as indicated:

| Metal | Color |
| --- | --- |
| Cobalt | Violet-brown. |
| Magnesium | Red-brown. |
| Zinc | Olive. |
| Lead | Orange. |
| Iron | Brown-violet. |

The copper, cobalt and magnesium chelates of the last two examples were shot-milled in acetone, drowned in water and the aqueous pastes were painted onto panels and exposed in a Fade-Ometer for 400 hours. There was essentially no change in the pigments at the end of this time.

In a similar manner, other aromatic dinitriles and other non-pyrrolic heterocyclic compounds may be synthesized in various combinations to produce hemiporphyrazines of the above types. Thus, as ortho-dinitriles, any of the following may be chosen: phthalonitrile, 4-nitro-phthalonitrile, naphthalene-1,2-dinitrile, thiophen-2,3-dinitrile, pyridine-2,3-dinitrile, pyrazine-2,3-dinitrile, 5,6-diphenyl pyrazine-2,3-dinitrile and thionaphthen-2,3-dinitrile. As heterocyclic compounds, 2,4-diamino-pyrimidine and 2,4-diamino-triazine may be mentioned in addition to the several representatives named in the above examples. Furthermore, either the dinitrile or the diamino compound or both may carry substituent groups such as: alkyl, aryl, alkoxy, aryloxy, nitro or halogen. Substituents, however, having reactive hydrogen atoms or ions, for instance amino and sulfo groups should be avoided, as these tend to enter into undesirable side reactions, decreasing the yield and purity of the principal reaction product aimed at.

In lieu of the ethylene glycol, other high boiling alcoholic solvents may be used for the synthesis, for instance glycerine, propylene glycol, or the lower monoalkyl ethers of diethylene glycol.

In lieu of pyridine as solvent in the metallization reaction, quinoline or dimethylaniline may be employed. Where the hemiporphyrazine is not sufficiently soluble in the chosen solvent to enable metallization at a sufficiently fast rate, addition of an organic base to convert the color into a more highly solvent-soluble salt thereof will often facilitate matters. This is illustrated in Example 9. It is not, however, essential in all cases, as further illustrated in Examples 10 and 11.

Numerous other variations in the details will be readily apparent to those skilled in the art.

In the claims below, the expression "pyrrolic ring" shall be understood as referring to a five-membered ring consisting of four C-atoms and one N-atom, thus:

whereas the expression "non-pyrrolic heterocyclic ring" shall be understod as embracing heterocyclic rings of more than five atoms total as well as five-membered rings of composition other than the pyrrolic ring. The expression "aromatic" is to be understood as referring to both homocyclic and heterocyclic unsaturated ring compounds.

I claim as my invention:

1. Hemiporphyrazines, the same being organic compounds having the same macrocyclic ring as the porphyrazines, but having only two pyrrolic rings conjugated with the macrocyclic rings, the remaining C–N–C groupings of the macrocyclic ring being conjugated with atoms outside the ring into unsaturated, non-pyrrolic heterocyclic rings consisting of carbon and nitrogen only and having not less than 5 and not more than 6 atoms in each ring.

2. An organic coloring compound being the equimolecular reaction product of a cyclo-unsaturated ortho dinitrile and a cyclo-unsaturated, non-pyrrolic, heterocyclic nitrogenous compound which has from 5 to 6 atoms in the heterocyclic ring and which bears two primary amino groups in positions ortho to a ring nitrogen atom, said compound being characterized by a color in the range of yellow to orange to brown, and by being insoluble in water, but being capable of reacting in organic solvents with organic bases and metals to yield respectively organic-base salts and metal chelates.

3. A compound as in claim 2, the cyclo-unsaturated heterocyclic compound being a 2,6-diamino-pyridine.

4. A compound as in claim 2, the cyclo-unsaturated heterocyclic compound being a 3,5,-diamino-1,2,4-triazole.

5. An organic coloring compound being the equimolecular reaction product of a homocyclic aromatic ortho dinitrile with a 2,6-diamino-pyridine, said compound being characterized by being insoluble in water, but having sufficient solubility in pyridine to yield a metal chelate when reacted in pyridine with a pyridine-soluble metal salt.

6. The metal chelates of a compound as defined in claim 5.

7. An organic coloring compound being the equimolecular reaction product of a homocyclic aromatic ortho dinitrile with a 3,5-diamino-1,2,4-triazole, said compound being characterized by being insoluble in water, but being reactive toward organic bases in pyridine solution to yield the corresponding organic base salt, and being further characterized by yielding a metal chelate when reacted with a pyridine-soluble metal salt, in pyridine solution, in the presence of an organic base.

8. The metal chelates of a compound as defined in claim 7.

9. A coloring compound being the reaction product of 2 moles of o-phthalonitrile with 2 moles of 2,6-diamino pyridine.

10. A coloring compound being the reaction product of 2 moles of o-phthalonitrile with 2 moles of 3,5-diamino-1,2,4-triazole.

11. A coloring compound being the reaction product of 2 moles of o-phthalonitrile with 2 moles of 1-phenyl-3,5-diamino-1,2,4-triazole.

12. A coloring compound being the reaction product of 2 moles of o-phthalonitrile with 2 moles of 3,5-diamino-1-(p-nitrophenyl)-1,2,4-triazole.

13. The process of producing organic coloring matters which comprises reacting, at a temperature above 165° C. and in an alcoholic solvent which boils at a temperature above 165° C., 2 moles of a cyclo-unsaturated o-dinitrile and 2 moles of a non-pyrrolic, unsaturated heterocyclic nitrogeneous compound which has from 5 to 6 atoms in the heterocyclic ring and bears two primary amino groups in positions ortho to a ring nitrogen atom, the reaction being continued until the separation of free ammonia is no longer observed, and recovering the solid reaction product.

14. A process as in claim 13 followed by further treatment of the recovered reaction product with an organic base in an organic liquid which has a solvent action on said reaction product and on said organic base, whereby to convert the reaction product into a salt thereof.

15. A process as in claim 13 followed by further treatment of the recovered reaction product with a metal salt in an organic liquid which has a solvent action on said reaction product and on said metal salt, whereby to form a metal chelate of the reaction product.

16. A hemiporphyrazine compound of the formula

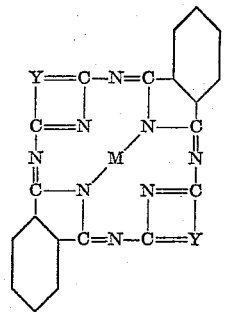

wherein Y represents an atomic grouping completing with the adjacent C—N—C grouping an unsaturated non-pyrrolic heterocyclic ring consisting of carbon and nitrogen only, having from 5 to 6 atoms per ring, and being free of amino and sulfo groups, while M represents a member of the group consisting of a bivalent metal, two hydrogen atoms and two cations of an organic ammonium base.

17. Hemiporphyrazines, the same being organic, macrocyclic ring compounds whose macrocyclic ring structure is expressed by one of the formulas

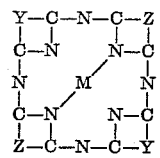

and

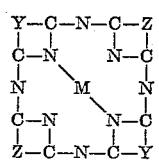

wherein Z represents the ortho-bivalent radical of a cyclo-unsaturated ring compound having from 5 to 10 atoms in its ring structure and which is free of nuclear substituents having reactive hydrogen atoms, Y represents an atomic grouping completing with the adjacent C—N—C grouping an unsaturated non-pyrrolic heterocyclic ring consisting of carbon and nitrogen only, having from 5 to 6 atoms per ring, and being free of amino and sulfo groups, while M represents a member of the group consisting of a bivalent metal, two hydrogen atoms and two cations of an organic ammonium base, said macrocylic ring structure having therein double bonds disposed in proper positions for balancing the valencies of the atoms contained therein.

18. Hemiporphyrazines, the same being organic, macrocyclic ring compounds whose macrocyclic ring structure is expressed by one of the formulas

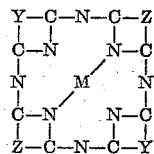

and

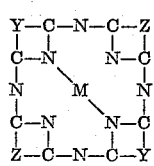

wherein Z represents the ortho-bivalent radical of a cyclo-unsaturated ring compound selected from the group consisting of benzene, nitrobenzene, naphthalene, thiophene, pyridine, pyrazine, diphenyl pyrazine and thionaphthene, Y represents an atomic grouping completing with the adjacent C—N—C grouping an unsaturated non-pyrrolic heterocyclic ring consisting of carbon and nitrogen only, having from 5 to 6 atoms per ring, and being free of amino and sulfo groups, while M represents a member of the group consisting of a bivalent metal, two hydrogen atoms and two cations of an organic ammonium base, said macrocyclic ring structure having therein double bonds disposed in proper positions for balancing the valencies of the atoms contained therein.

19. Hemiporphyrazine as in claim 18, wherein the groupings

and

represent the bivalent radicals of an unsaturated, non-pyrrolic, heterocyclic compound of the group consisting of pyridine, pyrimidine, triazine, triazole, 1-phenyl-triazole and 1-p-nitrophenyl-triazole.

20. A macrocyclic hemiporphyrazine compound of the formula

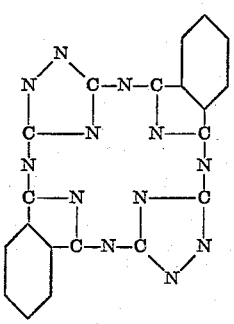

wherein four of the N-atoms in the molecule have their third valency satisfied by hydrogen, while the remaining N-atoms and the C-atoms of the compound have their extra valencies satisfied by double bonds within the molecule.

21. A macrocyclic hemiporphyrazine compound of the formula

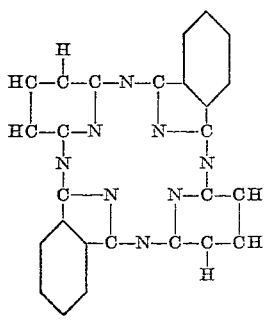

wherein two of the N-atoms in the molecule have their third valency satisfied by hydrogen, while the remaining N-atoms and the C-atoms of the compound have their extra valencies satisfied by double bonds within the molecule.

References Cited in the file of this patent
UNITED STATES PATENTS

| | | |
|---|---|---|
| 2,065,418 | Andersag et al. | Dec. 22, 1936 |
| 2,277,629 | Bradbrook et al. | Mar. 24, 1942 |
| 2,501,188 | Parker et al. | Mar. 21, 1950 |
| 2,607,778 | Phillips et al. | Aug. 19, 1952 |
| 2,692,267 | Campbell | Oct. 19, 1954 |